July 18, 1967

B. BURSON, JR 3,332,076

READING TIMER

Filed Dec. 18, 1964

INVENTOR.
BENARD BURSON, JR.

Le Blanc & Shur

BY

ATTORNEYS.

INVENTOR.
BENARD BURSON, JR.

*Le Blanc & Shur*

BY                          ATTORNEYS.

United States Patent Office 3,332,076
Patented July 18, 1967

3,332,076
READING TIMER
Benard Burson, Jr., Austin, Tex., assignor to Burson Electronics, Inc., Austin, Tex., a corporation of Texas
Filed Dec. 18, 1964, Ser. No. 419,362
8 Claims. (Cl. 340—384)

This invention relates to a reading timer and more particularly to a portable transistorized oscillator unit for producing audible impulses or clicks at a rate suitable for use as a timer for ascertaining reading speeds. The unit constitutes an important adjunct for instructors and teachers in rapid reading courses where it is desired to increase the reading speed of the pupils.

The device of the present invention is in many respects similar to previously proposed electronic metronomes heretofore used in music and speech instruction. In their simplest form metronomes consist of a pivoted pendulum with one fixed and one movable weight and have been used for many years to set a musical beat. More recent types employ a clockwork mechanism to drive the pendulum. However, as a substitute for these mechanical units it has been proposed to provide an electronic oscillator or electronic metronome as they are sometimes called for the same purposes as the previously used mechanical units. In at least one case it has been proposed to use an electronic device of this general type as an aid in speech instruction.

However, the previous electronic timers are not suited for use in reading instruction because of their limited frequency range and because of the requirement that they be continuously adjustable so as to be capable of producing the correct beat for a particular piece of music or a particular speaker. These disadvantages are overcome by the unit of the present invention which is particularly adapted to reading instruction which requires that a much wider range of frequencies be available in the unit. The device of this invention is provided with a simplified selector switch for quickly and easily ascertaining and selecting a desired frequency output. The unit may be calibrated at the factory and needs no further calibration as do the previously proposed electronic devices.

In the teaching process of the newly developed rapid reading courses, concentration by the student is very important. When the student is distracted by attempting to time himself his progress is retarded. Likewise the instructor is not at his maximum efficiency when acting both as an instructor and a stop-watch operator. By means of the present invention these difficulties are overcome. It is now possible to significantly improve the efficiency of the instructor and to release the concentration of the student so that he may devote full time to his reading material.

The most common way of timing reading speed is to determine the length of time required for a student to scan or read each page of a book or text. The time intervals recommended by several speed reading instructors necessitate an audible impulse or pulse every .5, 1, 2, 3, 4, 5, 6, 10, 12, 15 and 20 seconds. These times are selected in the use of the present invention by means of a simplified manual selector switch which may be turned to the desired time interval. To further enable the students to concentrate on their reading material, in some embodiments of the present invention an arrangement is provided for timing the total reading period. For example, the instructor may ask the student to read at a rate of one page per second for five minutes. Thus the student may set the first section of the timer to one second intervals and turn a page at every click. Then the student may set a second control to a position of five minutes. At the end of this five minute period the tone of the usual "click" becomes a "beep" resulting in one "beep" for every five minute interval. A suitable switch is provided so that this second section or portion of the unit may be used or not as desired.

The timer of this invention is adapted to be incorporated in a small casing or a housing and operated by batteries. The unit includes one or more transistors and inexpensive electrical elements so that it may be manufactured at a minimum cost. A single junction transistor is connected in a tickler feedback or blocking oscillator circuit and coupled through a transformer to a standard universal speaker. A jack is provided in the casing so that an earphone attachment may be plugged into the unit thus making it possible for the student to time himself without disturbing other members of the class. The oscillator draws power only during the split second of the click, thus substantially increasing the battery life which may be as long as 250 hours. The unit is very small and portable and can be mounted in a plastic box about three inches by six inches and by two and one-half inches. In some embodiments two timers are provided, one to control the rate of reading and the other the time of study.

It is therefore one object of the present invention to provide a novel and improved audible timer.

Another object of the present invention is to provide a novel timing device for instructing speed reading classes.

Another object of the present invention is to provide a simplified, inexpensive portable timer for producing an audible output at any one of a desired number of selectable timing periods.

Another object of the present invention is to provide an audible electronic timer having an increased range of selectable frequencies, making it suitable for timing the reading rates of speed reading class students.

Another object of the present invention is to provide a simplified reading timer having a novel arrangement for accurately setting the timing speed and which may be calibrated at the factory so as to require no further calibration by the operator.

Another object of the present invention is to provide a unit for timing both reading rate and total reading time.

These and further objects and advantages of the invention will be more apparent upon reference to the following specification, claims and appended drawings wherein:

The instructors of rapid reading courses state that optimum results are obtained by getting the student to work at a regular interval, that is, merely turning the pages at a rapid rate such as every 0.5 second for a period of time, and then slowing the student down to a much slower pace of about 6 to 10 seconds per page. The same effect is felt by the student as that of a driver who has been driving at 60–70 miles per hour and is suddenly slowed to 30 miles per hour to go through a city. The slower pace tends to give the illusion desired to create the correct mental attitude for the rapid reading student to progress. Therefore, instructors who know their needs in a timer best wish to have the time intervals of .5 second, 1, 2, 3, 4, 5, 6, 10, 12, 15 and 20 seconds per audible click. The shorter time intervals are used more for creating the illusion of rapid pace and then the more practical pace for comprehensive reading of 10 seconds per page or slower is set. Because of these requirements a satisfactory reading timer must have a very broad range of usable frequencies and the specific time intervals mentioned above must be selectable with a maximum of ease by the operator so as to avoid any undue interruption of the student's concentration and train of thought.

Figure 1:
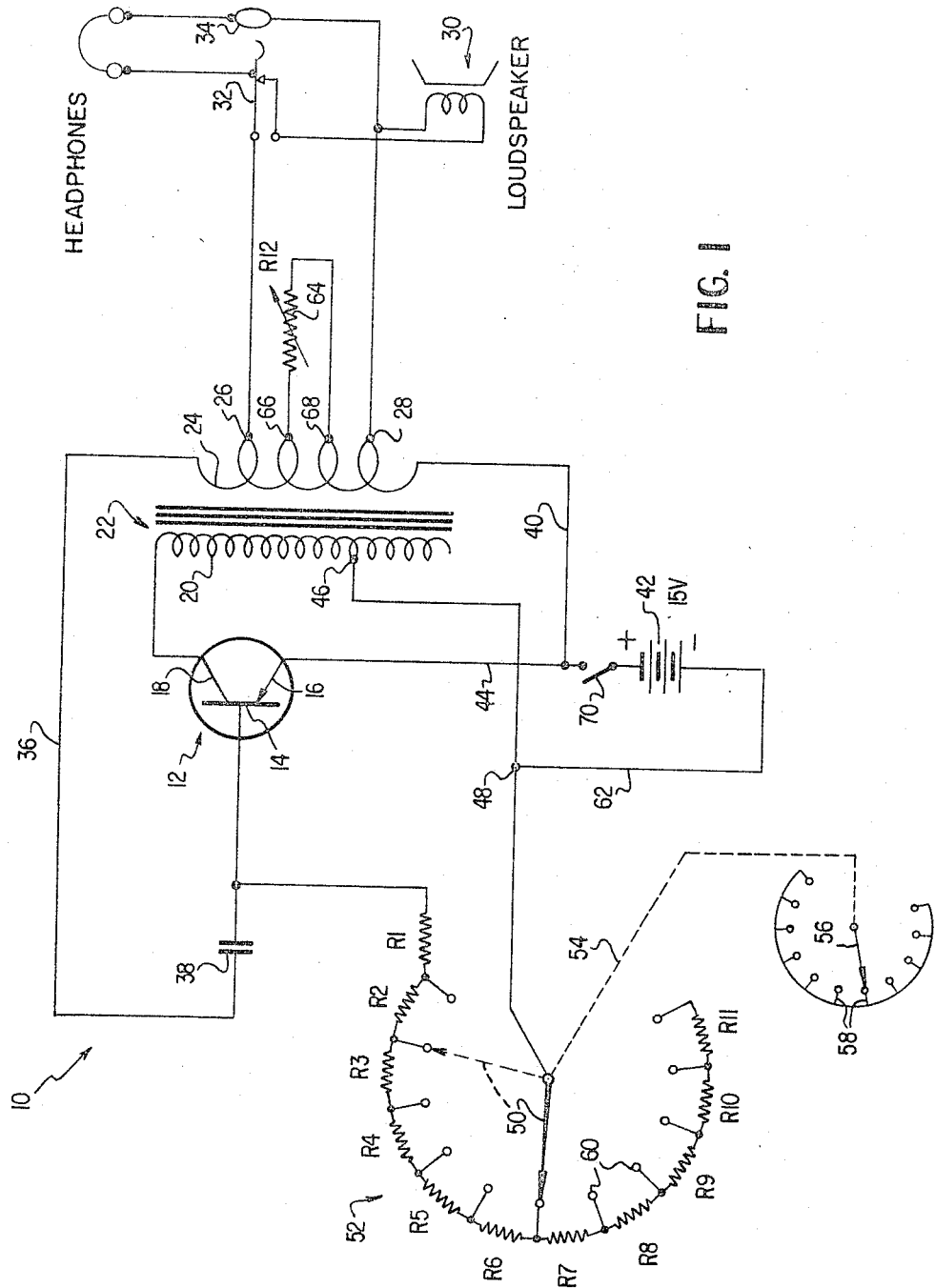
FIGURE 1 is a circuit diagram of a first embodiment of the novel reading timer of the present invention.

Referring to FIGURE 1 which shows a circuit diagram of a first embodiment of the present invention, the timer is generally indicated at 10 and includes a conventional junction transistor 12 of the PNP type, having a base 14, an emitter 16 and a collector 18. Connected to the collector 18 is one end of a primary winding 20 forming part of a transformer 22. The secondary 24 of the transformer is connected by way of taps 26 and 28 to a loudspeaker 30. As previously described, the unit is provided with a jack switch 32 for connection to a conventional earphone attachment as indicated at 34. When a suitable earphone attachment is inserted into the jack 34 the circuit to loudspeaker 30 is broken and the student may listen over the earphone to the audible clicks or impulses without disturbing anyone else in the room.

Secondary 24 of the transformer is also connected by way of a lead 36 to one plate of a capacitor 38. The other plate of this capacitor is coupled directly to the base 14 of the transistor 12. The lower end of the transformer secondary is returned by way of lead 40 to the positive side of a 15 volt battery 42. The positive battery terminal is also coupled by way of lead 44 to the transistor emitter electrode 16.

Connected adjacent the other end of primary 20 of the transformer by way of tap 46 and lead 48 is the wiper arm 50 of a multi-position rotary stepper switch generally indicated at 52. As indicated by the dash line 54 the wiper arm 50 is ganged with a manually activated pointer 56, preferably mounted on the front of the unit. The pointer is adapted to be manually moved into any one of a plurality of positions, as indicated by the indicia lines 58 which may be numbered or otherwise provided with suitable means for identifying the desired position and consequently the desired frequency of the audible output clicks at speaker 30 or earphone at 34. The stepper switch 52 is provided with a plurality of resistors labelled R1 through R11, separating contacts 60 adapted to be engaged by the wiper arm 50 as the pointer 56 is rotated. The wiper arm 50 is returned to the negative side of the battery 42 by way of lead 62.

In order to obtain an accurate output of frequencies or repetition rates in the steps mentioned above most suited for rapid reading classes, the values of resistors R1 through R11 must be carefully chosen consistent with the other parameters of the circuit so as to provide a broad range of frequencies. Transformer 22 may be a standard universal audio output transformer and in one embodiment constructed in accordance with the present invention was a unit manufactured by the Merit Company indicated as a model number A-2900. The Stancor Corporation and other manufacturers produce output transformers which also may be used in this invention. In the preferred embodiment the condensor or capacitor 38 was a standard electrolytic capacitor of 500 microfarads and rated at 12 volts. With these values, output repetition rates may be obtained with resistors in a switch 52 having the following values: R1—15,000 ohms, R2—an additional 15,000 ohms, R3—33,000 ohms, R4—33,000 ohms, R5, R6 and R7 each 33,000 ohms, R8—120,000 ohms, R9—68,000 ohms, R10—82,000 ohms, and R11—120,000 ohms. This arrangement provides for output rates of .5 second, 1, 2, 3, 4, 5, 6, 10, 12, 15 and 20 seconds per audible click, depending upon which one of the taps 60 is engaged by wiper arm 50.

In using the timer of the present invention, it is possible to obtain a more rapid reading rate by setting the wiper arm 50 to the dashed line position in FIGURE 1 such that a lower resistance is inserted in the oscillator circuit to provide a shorter time constant. Once the students have become accustomed to reading or scanning at this more rapid rate, the wiper arm may then be turned to the solid line position illustrated in FIGURE 1 so that the oscillator circuit incorporates a longer time constant. The student may be timed for more comprehensive reading at this slower rate.

In circuits of the type disclosed in FIGURE 1, the repetition rate of the oscillator output is generally considered to be largely dependent upon the discharging time constant of capacitor 38, that is, proportional to the capacitance of capacitor 38 times the total resistance inserted by switch 52. The repetition rate is also to some small extent dependent upon the voltage of the battery 42. However, applicant has found that the point of conduction of the transistor 12 in the circuit herein disclosed may be modified by changing the load impedance on the secondary of the transformer. By providing a variable resistor 64 connected to the secondary 24 by way of taps 66 and 68 it is possible to vary to some extent this conduction point so as to obtain a fine adjustment of the output frequency of the unit. In this way the switch 52 and its resistors may be calibrated at the factory to produce the desired output frequencies and any fine adjustment occasioned by drift in the unit such as might be caused by a variation in temperature or variations in battery voltage can be compensated for by a suitably modified value of resistor 64.

In operation, upon the closure of a suitable manual control switch such as switch 70 in series with the battery 42, the bias of the battery causes a current to flow in the collector circuit of the transistor and to pass through the primary winding 20 of the transformer. This induces a voltage in the secondary 24 which causes a current to flow through the base-emitter circuit of the transistor, i.e. across terminals 14 and 16 of the transistor which current flow acts to charge the capacitor 38. This action is cumulative and produces a rapidly rising current impulse in the transformer which results in the audible click heard at the speaker 30 or earphone at 34.

When the voltage across the capacitor reaches its maximum value, current flow in the collector and base-emitter circuits decreases, reversing the polarity of voltage induced in the secondary of the transformer. However, the base-emitter circuit of the transistor permits conduction in only one direction so that the capacitor discharges through the switch 52 rather than through the transistor. The time between pulses is largely determined by the discharge time constant of the capacitor 38 discharging through the switch. However, variations in the fine adjustment resistor 64 act to vary the loading on the transformer and affect the conduction point of the transistor so that the variable resistor 64 provides a fine adjustment in output frequency making it unnecessary to re-calibrate or otherwise modify the more complicated switch 52.

Figure 2:
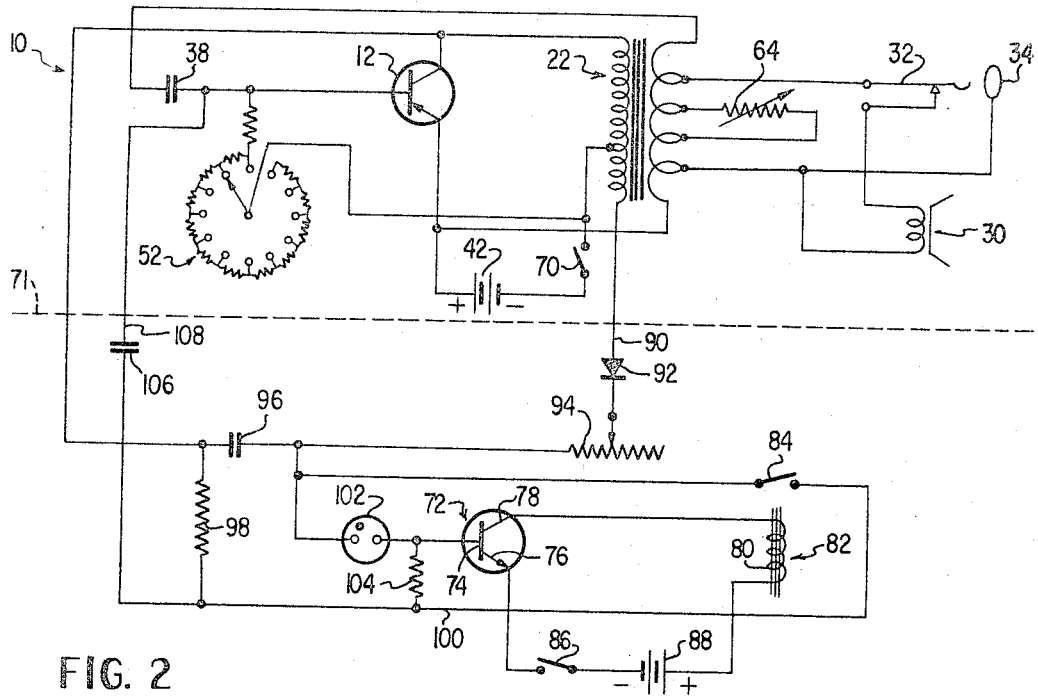
FIGURE 2 is a circuit diagram of a second embodiment of the present invention and FIGURE 3 is a circuit diagram of a third embodiment constructed in accordance with the present invention.

FIGURE 2 shows a modified embodiment of the present invention with like parts bearing like reference numerals. This unit comprises a first section or section A indicated as that portion of the unit above the dash line 71 corresponding to the timer 10 of FIGURE 1, and a second section or section B consisting of that portion of the circuit of FIGURE 2 below the dash line 71. In this embodiment the section A portion consisting of timer 10 provides the clicks or impulses previously described for ascertaining the reading rate of a student. The lower section B is provided for additionally ascertaining or determining the total reading time and consists of a second transistor 72 of the NPN type including a base 74, emitter 76 and collector 78. The output of the transistor is connected to the coil 80 of a relay generally indicated at 82. Energization of the coil 80 acts to close a normally open switch 84. The operation of this circuit is controlled by a manual switch 86 in turn coupled to a battery 88.

The lower end of the primary of transformer 22 is connected by way of lead 90 through a rectifier diode 92 to the wiper arm of a variable resistor or potentiometer 94. The potentiometer is in turn coupled to a second electrolytic capacitor 96 which is coupled through a resistor 98 and by way of lead 100 to switch 84. Coupled to the base 74 of transistor 72 is a discharge device in the form of a neon bulb 102. Also connected to the transistor is a further resistor 104. Impulses produced by the discharge of capacitor 96 through switch 84 are fed back by way of capacitor 106 and lead 108 onto the base of transistor 12 so as to impulse the transformer 22 and hence the speaker 30 or earphones 34.

The operation of the section A of the device illustrated in FIGURE 2 is similar to that previously described, that is, by turning on the switch 70 the speaker 30 commences clicking or thumping at a rate determined by the position of switch 52 and the fine adjustment resistor 64. The greater the resistance of switch 52, the longer time between the clicks. The lower section or section B of the unit is provided to enable students to also determine total reading time. For example, the instructor may ask the student to read at the rate of one page per second for five minutes.

Thus the student sets the timer switch 52 to one second intervals and turns a page every click. Then the student may set the tap on potentiometer 94 as a further control which acts to retard the charging of the lower section of the unit to about five minutes. At the end of this five minute period the tone of the usual click becomes a beep resulting in one beep for every five minute interval. More specifically, the voltage across the entire primary of transformer 22 is about 80 volts with a click or pulse generated when the timer 10 oscillates. This voltage is applied to electrolytic condenser 96 in the lower section of the unit and is rectified by the diode 92 such that the primary of the transformer charges the capacitor 96 with a D-C voltage at a rate dependent on the value of resistance afforded by potentiometer 94. Since the voltage is in the form of D-C pulses at an interval determined by the section A portion of the circuit, the length of time to charge the capacitor 96 depends on the rate set both by switch 52 and the value of resistance set in potentiometer 94. When capacitor 96 reaches a sufficient charge to cause conduction in the neon glow tube 102, transistor 72 conducts. Conduction of transistor 72 causes relay 82 to pull in, closing switch 84. This completes a circuit through resistor 98 around capacitor 96 permitting capacitor 96 to discharge. Resistor 98 is provided to prevent arcing of the relay contacts. As previously mentioned, this action also induces an impulse through capacitor 106 which is fed to the base of transistor 12 causing a pulse to be developed across transformer 22 and to be heard in the speaker 30 or in the earphone 34.

Figure 3:
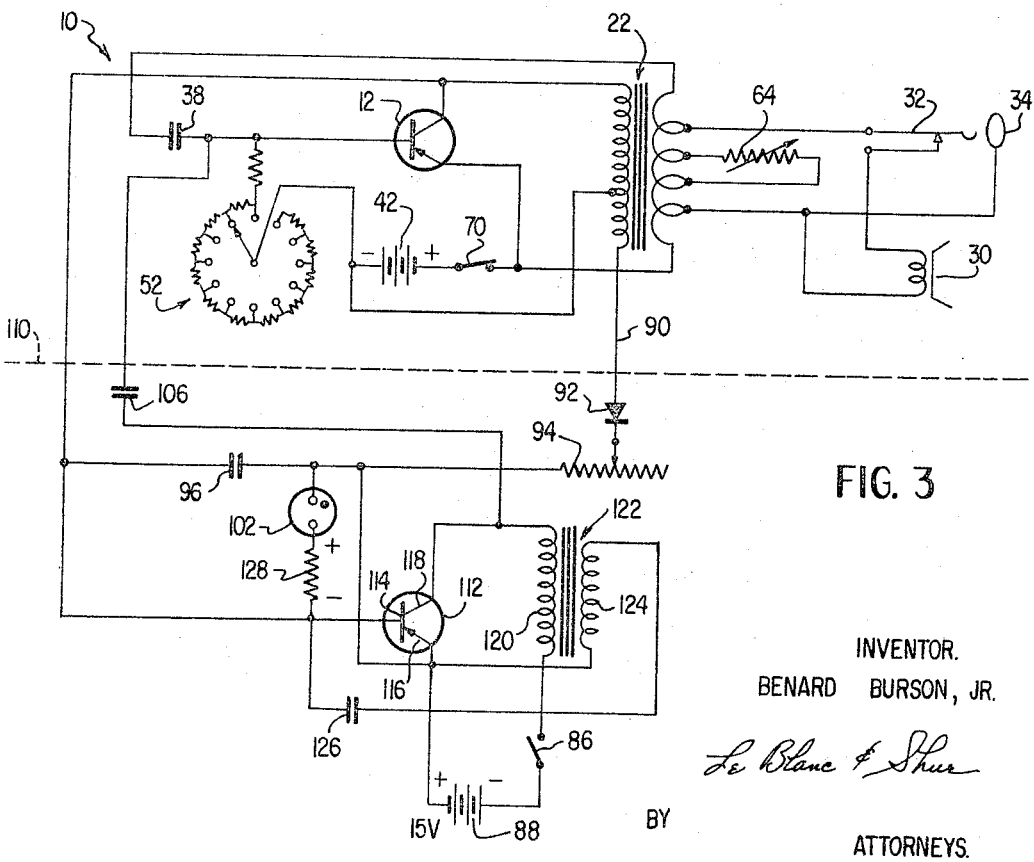

FIGURE 3 shows a further embodiment constructed in accordance with the present invention with like parts again bearing like reference numerals. As in FIGURE 2, the unit of FIGURE 3 includes an upper section or a rate timer 10 and a lower section or a total elapsed time indicator illustrated as that portion beneath the dashed line 110. In this embodiment the second transistor 72 is replaced by a PNP junction transistor 112 having a base 114, an emitter 116 and a collector 118. The transistor is connected to the primary 120 of a second transformer 122 whose secondary 124 is coupled through a feedback capacitor 126 to the base 114 of the transistor 112. This circuit again includes the rectifier 92 and the potentiometer or a variable resistor 94 coupled to the electrolytic capacitor 96.

In the operation of the lower section of the circuit of FIGURE 3, when the neon glow tube 102 fires due to the charge up of capacitor 96 as previously described, the negative potential that is generated at the lower side of resistor 128 causes conduction in the transistor 112. This conduction produces an impulse in the transformer 122 which is fed back by way of the secondary winding 124 and capacitor 126 to the base 114 much in the same manner as the action of oscillator 10. The beep or click impulse generated in the primary 120 of the transformer 122 by the conduction of transistor 112 is fed through capacitor 106, as in the previous embodiment, where it is amplified in transistor 12 and fed to the speaker 30 or earphones at 34, whichever is in the circuit, by way of transformer 22. This arrangement gives a second definite tone which is synchronized with the click of the oscillator 10 of the Section A portion of the circuit.

As can be seen from the above, the present invention provides a very simplified, inexpensive and reliable tone or audible signal generator particularly suited for use as an aid to instructors for teaching rapid reading courses.

Important features of the present invention include not only its simplicity and the fact that it can be made of small size and battery operated, but the fact that the unit also provides a very wide range of frequencies which may be easily selected by simply manually manipulating a stepper switch to any one of a discrete number of selected frequencies. In spite of the fact that the unit provides an accurately timed output over a wide frequency range, the device, once calibrated at the factory, requires no further calibration since the variable resistor 64 at the output provides a novel arrangement for making fine adjustments in the output frequency by simply varying the load on the secondary of the output transformer. By means of a conventional jack switch the unit may be switched from speaker to earphone operation so as to not interfere with the concentration or otherwise annoy others who may be nearby.

The embodiments of FIGURES 2 and 3 include an additional section which provides an impulse at the end of a given time period such as five minutes which impulse may be adjusted and regulated by the variable resistor or potentiometer 94 of the unit. This second section may be switched in and out of the circuit as desired by means of switch 86 so that the student may use this section only if he so wishes without any adverse effect on the rate timer 10 of the unit. Since the principal portion of the timing interval is determined by the discharge rate of capacitor 38 across transistor 12, the unique arrangement of FIGURES 2 and 3 as provided has little or no effect on this discharge rate and hence does not adversely affect the operation of the portion 10 of the circuit. This arrangement further assures that the timing impulses from the lower section of the unit are in synchronism with those produced from the upper section since the lower section impulses only occur when an upper section impulse drives the neon tube into conduction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A timing device comprising audible output means, first means coupled to said audible means for impulsing said audible means at a first rate, second means coupled to said audible means for impulsing said audible means at a multiple of said first rate, and means coupling said first and second impulsing means for synchronizing the impulses from each of said means.

2. A reading timer comprising a transistor blocking oscillator having a feedback transformer and a discharge capacitor, audible output means coupled to the secondary of said transformer, a variable resistance in the discharge path of said discharge capacitor, a second capacitor coupled to the primary of said transformer, means for charging said second capacitor in response to impulses in said transformer, and means responsive to a build up of charge on said second capacitor for triggering said blocking oscillator.

3. A timer according to claim 2 wherein said charging means comprises a rectifier and variable resistor.

4. A timer according to claim 3 wherein said charge responsive means comprises a neon tube which breaks down when the charge on said second capacitor exceeds a predetermined value.

5. A timer according to claim 4 including a relay, and NPN junction transistor means for pulling in said relay in response to break down of said neon tube.

6. A timer according to claim 4 including a second blocking oscillator having a PNP junction transistor rendered conductive by the breakdown of said neon tube.

7. A reading timer comprising a transistor blocking oscillator including a feedback transformer and a discharge capacitor, audible means including a speaker and an earphone jack switch coupled to the secondary of said transformer for producing a series of audible output beats, a variable resistance selector switch in the discharge path of said capacitor, said switch being variable in discrete steps over an output range of about from ½ to 20 seconds per beat, and a fine tuning variable resistor coupled across at least a portion of said transformer secondary.

8. A timer according to claim 7 including earphones coupled to said jack switch.

References Cited

UNITED STATES PATENTS

| | | |
|---|---|---|
| 2,926,284 | 2/1960 | Finkelstein et al. -- 331—112 X |
| 2,926,347 | 2/1960 | Thiele -- 340—384 |
| 3,271,670 | 9/1966 | Esakov et al. -- 331—112 X |

OTHER REFERENCES

Garner, Louis E., Jr.: A Transistor Code Practice Oscillator, Radio and Television News, April 1953, pp. 40–41, 99.

Louis, E. G.: A Transistorized Pulse Generator, Radio and Television News, January 1956, pp. 64–65, 124–125.

NEIL C. READ, *Primary Examiner.*

D. L. TRAFTON, *Assistant Examiner.*